United States Patent
Blom-Bakke

[15] 3,668,933
[45] June 13, 1972

[54] AIRCRAFT INSTRUMENTS

[72] Inventor: Blom-Bakke, Pernilles vei 7, Oslo 7, Norway

[22] Filed: March 30, 1970

[21] Appl. No.: 23,945

[30] Foreign Application Priority Data

March 29, 1969 Norway .................................1327/69

[52] U.S. Cl................................................73/386, 73/387
[51] Int. Cl. ........................................................G01l 7/12
[58] Field of Search ....................................73/384, 386, 387

[56] References Cited

UNITED STATES PATENTS 3,057,583 10/1962 Majendie et al. ........................73/387
2,458,022 1/1949 Phelps et al..............................73/387

Primary Examiner—Donald O. Woodiel
Attorney—William D. Hall, Elliott I. Pollock, Fred C. Philpitt, George Vande Sande, Charles F. Steininger and Robert R. Priddy

[57] ABSTRACT

An aircraft height-indicator shows height in pressure-based units that correspond to intervals of vertical distance which increases in magnitude as height increases and which define economically separated flight levels. Height, and flight level, according to these units is indicated digitally, intermediate values being shown in analog by a pointer against an equally divided scale. The digital and analog indications are taken from the rotational position of a cam which is driven to counteract displacement of manometric capsules sensitive to static pressure P, and which is profiled to provide rotation dependent on $P^n$ where $n$ lies between 0.4 and 0.8.

9 Claims, 3 Drawing Figures

Arne Blom-Bakke
Inventor by Hall, Pollock & Vande Sande
Attorneys

AIRCRAFT INSTRUMENTS

This invention relates to aircraft instruments and is concerned in particular with instruments for providing a representation of height of an aircraft.

Air-space for air-traffic purposes is divided under international agreement into flight levels that are separated from one another vertically by prescribed distances. At the present time it is agreed, having regard to such factors as maneuverability and speed of transport aircraft, traffic density, and overall safety, that a vertical separation of 1,000 feet is appropriate at the height of 29,000 feet, and this value has also been adopted as a convenient standard unit of separation upon which to base flight levels up to this height; accordingly the first flight level is at a height of 1,000 feet, the second at 2,000 feet, and so on up to the 29th at 29,000 feet. For normal operational heights above 29,000 feet the standard flight level separation is 2,000 feet.

In many of the busier air-traffic control areas of the world there is already saturation of the air-space, and an attempt to increase capacity has been made by reduction of the horizontal separation of aircraft on the same flight level. A reduction in the vertical separation between flight levels would in itself, however, bring increase in capacity, and this at certain heights would not involve any significant reduction in the present standard of safety. It can be shown for flight levels up to 29,000 feet that the same standard of safety as obtained at this height with a vertical separation of 1,000 feet, can be obtained with smaller values of separation distance. The separation required decreases with decrease in height from 29,000 feet, to a value of only some 624 feet at sea level. Above 29,000 feet the separation required to maintain the same standard of safety, increases from 1,000 feet up to some 2,590 feet at a height of 70,000 feet. It is clear therefore, that the present flight level separation of 1,000 feet for heights up to 29,000 feet, and 2,000 feet for heights above, is wasteful of air-space. Furthermore, if, as has been proposed, a separation of 1,000 feet were to be adopted up to 50,000 feet, this would result in reduction in the present safety standard above 29,000 feet and still not afford any more economical use of the air-space below.

Economy in air-space below 29,000 feet could clearly be achieved by departing from the present separation unit of 1,000 feet and prescribing values that decrease gradually in magnitude from 1,000 feet for successively lower flight levels down to the first at 624 feet above sea level. Similarly, values that increase gradually in magnitude from 1,000 feet could be prescribed for flight levels above 29,000 feet. More flight levels than at present would in this way become available without any degradation in the accepted standard of safety, but the resultant scheme would impose unreasonable demands on the aircraft crew. The normal height-indicating instruments used in aircraft at the present time provide a decimal-indication of the height in feet, and so the present unit of vertical separation (1,000 feet or 2,000 feet depending on the height range involved) is conveniently related to the indication. The simple relationship enables the crew to remember, and recognize from the instruments, the height appropriate to whichever flight level is allotted to the aircraft, without effort. Furthermore they can quickly detect, and make appropriate correction for, any deviation from the allotted flight level. None of this could be expected to apply, however, with a scheme based on varying separation-distances between successive flight levels, the burden of relating any particular flight level of the scheme to height, and vice versa, being in the present circumstances, too great.

It is an object of the present invention to provide an instrument for providing a representation of height of an aircraft, that will enable a more economical use of air-space to be achieved without the attendant disadvantage of imposing an unreasonable burden on the aircraft crew in relating flight level and height to one another.

According to the present invention there is provided an instrument for providing a representation of height of an aircraft wherein it is arranged that said representation varies in accordance with $P^n$, where P is the atmospheric pressure at the aircraft-height, and $n$ has a value intermediate 0.19025 and 1.0 such that unit intervals of the representation correspond to intervals of vertical distance that increase in magnitude with increase in height.

The representation provided by the instrument of the present invention varies non-linearly with height as measured in conventional units of vertical distance, and although this might from a subjective point of view appear a disadvantage, it does nonetheless have advantage in providing a height measurement that is more conveniently related to aircraft operation. In these circumstances a scheme of flight levels that gives an economic use of air-space can readily be prescribed, based on unit intervals of the representation, the choice of the particular value of the exponent $n$ used for this being made with reference to flight safety standards accepted at the time.

In order that the invention may be more readily explained, reference will now be made to the drawings, in which.

Figure 1:
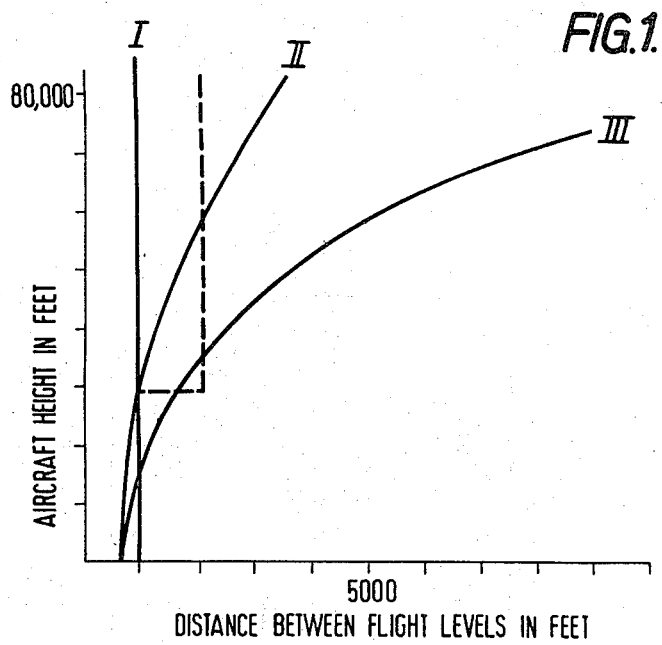
FIG. 1 illustrates by curves I to III various relationships between aircraft height and the distance separation of flight levels, relevant to an understanding of the present invention.

Referring to FIG. 1, the curve I shows in full line the circumstances that apply today for aircraft flying at, or below, 29,000 feet, the prescribed separation of flight levels being 1,000 feet irrespective of the height of the aircraft. The value of 1,000 feet was arrived at as being the separation that is desirable in the circumstances that apply for flight at 29,000 feet, and is applied universally below this in spite of the fact that as height decreases the same degree of safety is obtainable with less separation. The same separation of 1,000 feet has been proposed for heights above 29,000 feet, but the separation prescribed at the present time for these is 2,000 feet, as indicated by the broken line projected out from curve I.

As an alternative to basing flight level separation on the unit intervals of distance, namely 1,000 or 2,000 feet, it would be possible instead to adopt the scheme represented by curve III where the separation is based on unit intervals of pressure change. As indicated generally by curve III, however, this is wasteful of air-space in that the distance between flight levels increases rapidly with height of the aircraft and gives excessive uneconomical separation. For example, as shown by curve III, the distance separation between flight levels at a height of 29,000 feet is some 1,600 feet and at 50,000 feet is some 3,900 feet.

Figure 3:
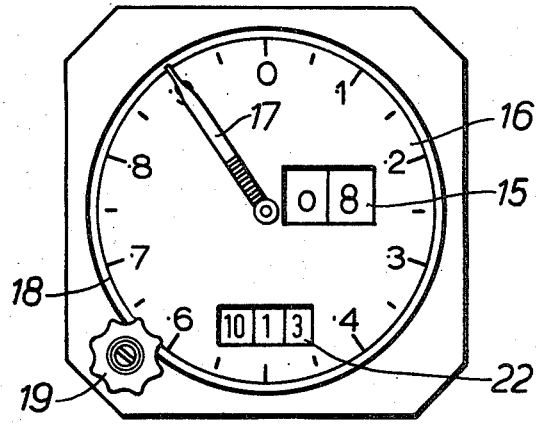
FIG. 3 is a front view of the instrument of FIG. 2.
Figure 2:
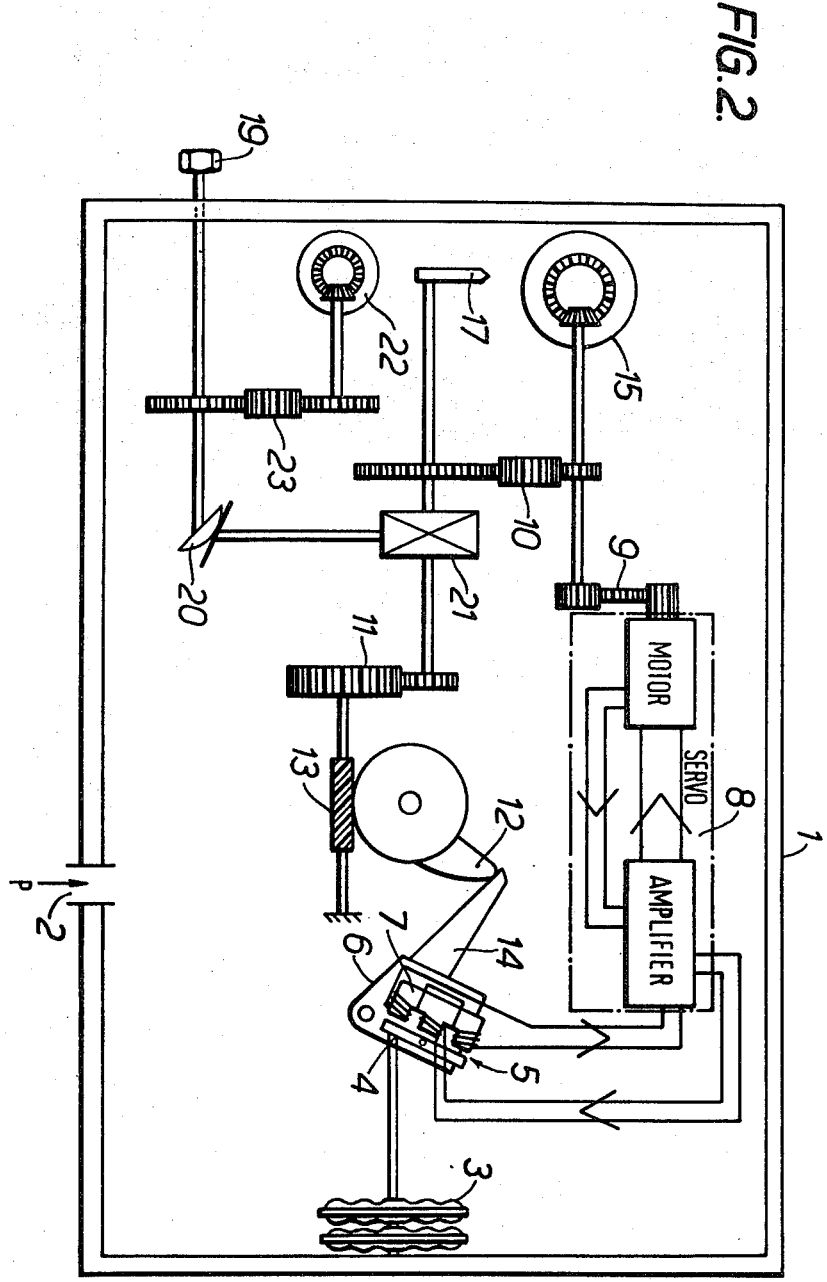
FIG. 2 is a schematic representation of an aircraft instrument that provides simply an example of an instrument in accordance with the present invention.

The third curve, curve II, shown in FIG. 1, illustrates the scheme used in the instrument of FIGS. 2 and 3, where the separation of flight levels is based on unit intervals that are inversely proportional to change in pressure between those levels. For the scheme of curve II:

$$S_h/S_o = \Delta P_o/\Delta P_h = S_o d_o/S_h d_h \quad (1)$$

where:

$S_o$ is the distance above sea level of the first flight level, $S_h$ is the distance above the flight level at the height of $h$ feet above sea level, of the next flight level, $\Delta P_o$ is the change in atmospheric pressure P in ascent from sea level to the first flight level, $\Delta P_h$ is the change in atmospheric pressure P in ascent from the flight level at $h$ feet above sea level, to the next flight level, $d_o$ is the average air density between sea level and the first flight level, and $d_h$ is the average air density between the height of $h$ feet above sea level, and the next flight level above this.

From equation (1):

$$S_h = S_o(d_o/d_h)^{0.5} \quad (2)$$

Curves I and III can be represented respectively as:

$$S_h = S_o(d_o/d_h)^0$$
$$S_h = S_o(d_o/d_h)^1$$

and curves corresponding to curve II, lying between curves I and III, have the general equation:

$$S_h = S_o(d_o/d_h)^x \quad (3)$$

where:

$$0 < x < 1$$

It has been found that when the value of 0.5 is taken for the exponent x in this general equation, that is to say, when the equation (2) is used, there results an economic regime of unit intervals of flight level separation throughout a very substantial range of heights, even when consideration is given to likely future increases in normal flying heights. From reference to the internationally agreed equation for the standard atmosphere, relating the pressure P in millibars to height H in thousands of feet, namely:

$$P = 1013.25(1 - 1.98H/288.16)^{5.2561}$$

equation (2), implies measurement of height in accordance with the function:

$$A - BP^n \quad (4)$$

where:

A and B are both constants, and n in this specific instance ($x = 0.5$) is 0.59513.

Unit intervals of height according to this function correspond to intervals of vertical distance that are of increasing magnitude with increase in height. Representation of height in accordance with this function is provided by the instrument shown in FIGS. 2 and 3.

Referring to FIGS. 2 and 3, the instrument has a sealed casing 1 that is coupled via a pressure connector 2 to the static-pressure sensing device (for example, a pitot-static probe) of the aircraft, so that the interior of the casing 1 is maintained, at least approximately, at the ambient, free-stream, atmospheric pressure P external of the aircraft. The casing 1 contains two manometric capsules 3 that are both evacuated and are coupled in series with one another to the I-bar 4 of an 'E and I' electromagnetic pick-off 5 that is carried by a pivoted carriage 6. The bar 4 is pivoted to the carriage 6 and the capsules 3 in response to change in sensed static pressure displace this angularly with respect to the electrically wound E-core 7 of the pick-off 5. An electrical signal derived in accordance with the consequent electrical unbalance in the core 7 is applied to an electrical servo 8 that is coupled through three trains of gears, 9 to 11, to drive a cam 12 via a worm 13. A cam-follower 14 engages the cam 12 to adjust the angular position of the carriage 6, and with it the angular position of the core 7 relative to the bar 4, in accordance with rotation of the cam 12.

The cam 12 is driven by the servo 8 to a rotational position $\theta$ in which electrical balance is restored in the core 7. This position $\theta$ is related to the sensed pressure P, through the displacement of the bar 4 and the profiling of the cam 12, according (at least approximately) to:

$$\theta = a - bP^{0.59513}$$

where: a and b are both constants.

In this way therefore, there is provided representation of height according to a function of the pressure P corresponding to function (4), and this representation after application of a constant scaling factor is appropriate for the direct indication of flight level of the aircraft. A digital indication of flight level is in this respect provided by a digital-drum counter 15 that is driven through the gear train 9 and is exposed, as shown in FIG. 3, through an aperture in the faceplate 16 of the instrument. A pointer 17 is also driven through the gear trains 9 and 10 to sweep once around a circular scale 18, marked on the faceplate 16 and divided into 10 equal parts, for each change in digital reading of the counter 15.

The indications provided by the counter 15 and pointer 17 can be adjusted by the pilot using a knob 19 that is coupled to them via a cam arrangement 20 and a differential gear 21 intercoupling the gear trains 10 and 11. The adjustment is made to compensate for deviation from standard in the barometric pressure at ground or sea level. A decimal indication of the datum barometric pressure to which the instrument is in this way set, is provided by a digital-drum counter 22 that is visible through an aperture in the faceplate 16 and is driven from the knob 19 via a gear train 23.

With the knob 19 set in accordance with the appropriate datum barometric pressure, the instrument provides the pilot with a clear indication of the aircraft flight level. The counter 15 indicates the number of the flight level and the pointer 17 the extent to which there is any deviation from this. Thus all the pilot is required to do is to bring the aircraft to the height at which the flight level number advised by the air-traffic controller, is shown by the counter 15 with the pointer 17 at zero on the scale 18. In ascent from sea level the first flight level is reached, and "1" is accordingly indicated by the counter 15, at a vertical distance of about 624 feet above sea level. As the aircraft ascends further so the vertical distance between the successive flight levels increases in accordance with equation (2) so that, for example, the flight level "15" at a height of about 10,000 feet is separated from flight level "16" by a vertical distance of some 726 feet, whereas flight level "37" at about 29,000 feet is separated from the flight level "38" by some 999 feet. At greater heights, flight level "54" at about 49,000 feet is separated by some 1,616 feet from flight level "55," whereas flight level "62" at about 64,000 feet is separated from the flight level "63" by some 2,373 feet. The pointer 17 throughout shows against the equally divided scale 18 any deviation from the indicated flight level in unit intervals that, like those of flight level, correspond to intervals of vertical distance that increase in magnitude with increase in height. The complete indication is therefore of aircraft height according to a continuous law which is related throughout in a convenient way to the factors affecting flight at different heights, and which, by the suitable choice of unit size made, gives an economical and coherent flight level scheme.

Although with the instrument described above, the specific value of 0.5 is used for the exponent x in the general equation (3), slightly different values in the range from 0 to 1 might well be chosen. For example, values of 0.4 or 0.6 may be used, these corresponding to function (4) with the exponent n having values of 0.51415 and 0.67610 respectively. As a general matter, the value of the exponent n in function (4) is related to the value of x according to:

$$n = 0.19025 + 0.80975x$$

and so the full range of choice of this between the schemes represented by curves I and III in FIG. 1, is from 0.19025 to 1.0, the choice in each case being influenced by such factors as the standard of instrumentation, in particular of height-lock facilities, provided in aircraft. The factors quoted in the latter respect might enable smaller separation distances to be tolerated, but there are of course other factors such as increase in speed tending to give rise to larger potential deviation from an assigned level, that might well act in the opposite sense. In present-day circumstances it appears that a convenient range for the value of the exponent n is from 0.4 to 0.8.

The instrument described above with reference to FIGS. 2 and 3 involves a servo-driven cam to provide the appropriate law relating the output indication to the sensed pressure P. The present invention is not limited to the use of a servo-driven cam for this purpose; for example it is possible for the sensing capsule or capsules to be so characterized that displacement produced from them is itself related to the sensed pressure P according to the law, either directly or via a linkage or cam.

Although a single value of n can in normal circumstances be found to apply satisfactorily throughout the complete range of aircraft-height, it would nonetheless be possible with an instrument according to the present invention, to use different values to apply throughout different discrete parts of the range.

I claim:

1. An instrument for providing a representation of height of an aircraft in terms of flight level, comprising first means for responding to atmospheric pressure P at the aircraft height, and second means for providing said representation in accordance with the response of said first means, said first means including means for providing a measure of a variable that varies in accordance with $A-BP^n$ where $A$ and $B$ are constants and $n$ has a predetermined value intermediate 0.19025 and 1.0, and said second means including means for providing said representation of aircraft height in terms of flight level in accordance with said measure such that unit intervals of the representation correspond to intervals of vertical distance that increase in magnitude with increase in height.

2. An instrument according to claim 1 wherein said second means includes a device for providing a digital representation in accordance with said measure.

3. An instrument according to claim 2 wherein said device is a counter for indicating the aircraft height in decimal digits.

4. An instrument according to claim 1 wherein said second means includes an equally divided scale, a pointer, and means for positioning said pointer relative to the scale in accordance with said measure.

5. An instrument according to claim 1 wherein $n$ has a value, at least approximately, of 0.59513.

6. An instrument according to claim 1 wherein $n$ has a value, at least approximately, of 0.51415.

7. An instrument according to claim 1 wherein $n$ has a value, at least approximately, of 0.67610.

8. An instrument according to claim 1 wherein $n$ has a value within the range from 0.4 to 0.8.

9. An instrument according to claim 1 wherein said first means comprises a displacement device having first and second parts that are both movable relative to one another, manometric means responsive to the pressure P and coupled to said first part of the displacement device to displace said first part relative to the second part to an extent dependent upon the pressure P, cam means coupled to the said second part, and a servo responsive to displacement between said first and second parts to drive the cam means, and with it said second part relative to said first part, to counteract the said displacement of said first part relative to said second part, and wherein said second means comprises an indicator device and means coupling said servo to said indicator device to apply drive to said indicator device in accordance with the drive applied to said cam means.

* * * * *